Figure 1:
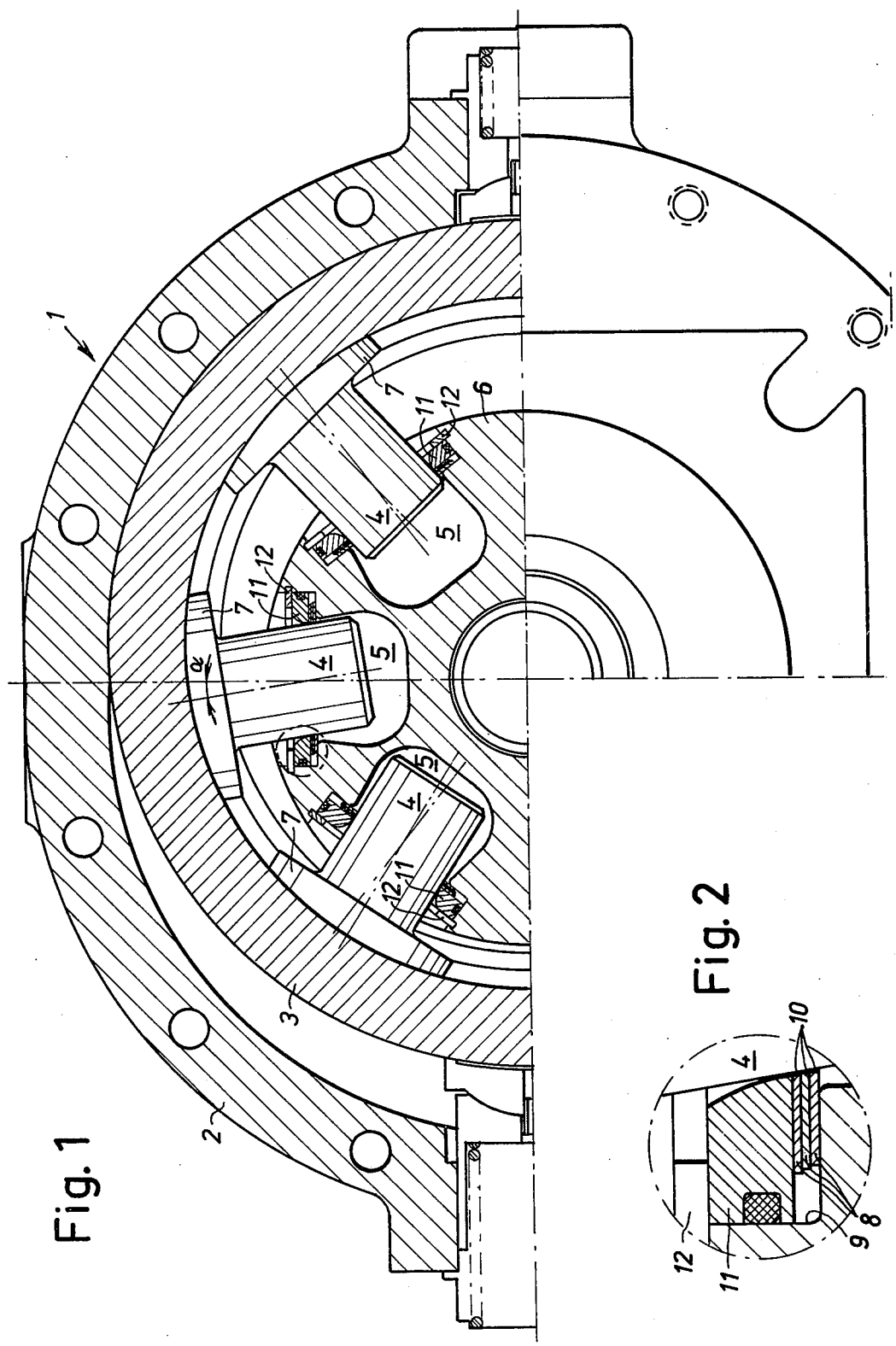

United States Patent [19]

Johansson

[11] 4,455,028
[45] Jun. 19, 1984

[54] SEALING DEVICE WITH RADIALLY SLITTED METAL WASHERS FOR HYDRAULIC PISTON MECHANISMS

[75] Inventor: Ingvar Johansson, Lilla Edet, Sweden

[73] Assignee: Volvo Flygmotor AB, Trollhattan, Sweden

[21] Appl. No.: 501,307

[22] Filed: Jun. 6, 1983

[30] Foreign Application Priority Data

Jun. 4, 1982 [SE] Sweden ............................. 8203484

[51] Int. Cl.$^3$ ............................. F16J 15/28; F16J 9/00
[52] U.S. Cl. .................................. 277/53; 277/83; 277/174; 277/236; 277/25
[58] Field of Search .................... 277/12, 25, 32, 53, 83, 277/54, 173–177, 216, 217, 236

[56] References Cited

U.S. PATENT DOCUMENTS

| | | |
|---|---|---|
| 2,956,845 | 10/1960 | Wahlmark. |
| 3,160,416 | 12/1964 | Ryffel ................... 277/25 X |
| 3,460,842 | 8/1969 | Pointer et al. .............. 277/53 X |

FOREIGN PATENT DOCUMENTS

| | | |
|---|---|---|
| 147205 | 1/1904 | Fed. Rep. of Germany ...... 277/205 |
| 2014298 | 7/1971 | Fed. Rep. of Germany ........ 277/53 |
| 2440037 | 3/1976 | Fed. Rep. of Germany. |
| 190707 | 7/1964 | Sweden. |
| 210202 | 1/1967 | Sweden. |
| 228279 | 11/1943 | Switzerland .................. 277/173 |

*Primary Examiner*—Robert S. Ward
*Attorney, Agent, or Firm*—Pollock, Vande Sande & Priddy

[57] ABSTRACT

A sealing device for a piston of the type which is rigidly connected with the associated piston rod and which is adapted in a reciprocatory motion within an enclosing cylinder to be inclinable a small angle with its longitudinal axis relative the center axis of the cylinder, said piston being intended for use in hydraulic mechanisms, particularly such mechanisms having high hydraulic fluid pressures, is adapted to provide a seal between the cylinder wall and the piston and piston rod assembly and to comprise a plurality of metal sealing rings. In order to provide a more efficient and enduring sealing device which still is simpler less expensive in manufacture, it is suggested according to the invention that the sealing rings consist of three or more annular and radially slitted washers of sheet metal, said washers being arranged radially slidable in a common circumferential groove in the cylinder wall adjacent the piston rod end thereof for self-adjustment with its inner edge surface into sealing engagement with the outer peripheral surface of the piston and piston rod assembly according to the varying inclined position of said assembly.

2 Claims, 2 Drawing Figures

SEALING DEVICE WITH RADIALLY SLITTED METAL WASHERS FOR HYDRAULIC PISTON MECHANISMS

The present invention refers to a sealing device for a piston of the type which is rigidly connected with the associated piston rod and which is adapted in a reciprocating motion within an enclosing cylinder to be inclinable a small angle with its longitudinal axis relative the centre axis of the cylinder, said piston being intended for use in hydraulic mechanisms, particularly such mechanisms having high hydraulic fluid pressures, the sealing device being adatped to provide a seal between the cylinder wall and the piston and piston rod assembly and to comprise a plurality of metal sealing rings.

Pistons of the afore-mentioned type which are rigidly connected with the associated piston rod and therefore during its reciprocatory motion in an enclosing cylinder have to be inclinable a small angle with its longitudinal axis relative the centre axis of the cylinder are used in hydraulic axial and radial piston machines but also in control pistons and alike. In order to achieve a good sealing action between the piston and the cylinder wall for all occuring positions of inclination of the piston and the piston rod relative the centre axis of the cylinder various sealing ring arrangements have been suggested. Thus it can be referred to the Swedish patent specification Nos. 190,707 and 210,202 which disclose part-spherical peripheral surfaces on piston rings located in grooves in the piston. More penetrating studies of the operation of said rings in combination with experiencies from practice in manufacture and operation of machines having such sealing ring devices has shown that said so-called spherical piston rings still suffer from certain drawbacks which as time goes on have become more and more troublesome.

Quite recently a suggestion has been made for eliminating the drawbacks in previously known spherical piston rings by substituting them by two or more annular and radially slitted metal washers, particularly of steel and having a straight cylindrical outer peripheral surface. In tests, said rings have turned out to provide improved sealing conditions and wear-resistance in combination with a simpler and less expensive manufacture. The main reason thereto seems to be a different and more favourable function of such rings made as washers in comparison with a spherical piston ring.

In said application the rings made as washers thus are utilized in sets in order to seal with their outer peripheral surface against the cylinder wall, but a generalizing of said idea reasonably would imply that said kind of ring arranged in sets also ought to provide a similar sealing action with its *internal* peripheral surface. This has now been confirmed by experiments and as a consequence there has been obtained a quite new and surprisingly simple possibility to achieve a complete and effective sealing by a structural inversion of the afore-mentioned concept.

Certainly, for a purely parallel or translatory piston rod movement in the cylinder, thus without the occurence of an inclination of the piston, there has been suggested for applications having relatively low pressures, as disclosed in the German patent publication writ No. 2,440,037, a piston ring assembly consisting of a plurality of mutually equal cylindrical rings. Should attempts be made to apply said piston ring structure in connection with piston and piston rod assemblies inclinable in the cylinder, a fully unsatisfactory sealing action would be achieved as well as other drawbacks such as leakage through the ring gaps and liability to erosion damages.

The main object of the present invention now is to eliminate the drawbacks inherent in prior structures as stated above and this is obtained owing to the invention, the distinguishing features of which are that the sealing rings consist of three or more annular and radially slitted washers of sheet metal, said washers being arranged radially slidable in a common circumferential groove in the cylinder wall adjacent the piston rod end thereof for self-adjustment with its inner edge surface into sealing engagement with the outer peripheral surface of the piston and piston rod assembly according to the variying inclined position of said assembly.

Owing thereto, a number of advantageous actions is obtained. In, e.g., a radial piston machine, in which the pistons previously must have been pivotally journalled on a ball joint at the end of the piston rod for being able to accomodate angle variations of the piston-ring-equipped piston during the motion of the same in the cylinder bore, the piston and piston rod now instead thus can be made as a common cylindrical and rigid unit of uniform thickness, which moves to and from in slightly widened cylindrical chambers, at the piston rod end of which is mounted a set of washer-like rings according to the present invention. From a manufacturing point of view this is a great advantage and furthermore the lubrication problems from which such joints suffer due to the fact that they cannot be hydrostatically balanced, are eliminated.

Also in control pistons in which an articulated joint between piston rod and piston or piston rod and actuation member otherwise would be required for accomodation of angle variations, such articulation joints now can be omitted and the piston and piston rod assembly instead be sealed by means of a sealing ring device according to the invention, mounted at the piston rod end of the cylinder.

Figure 2:
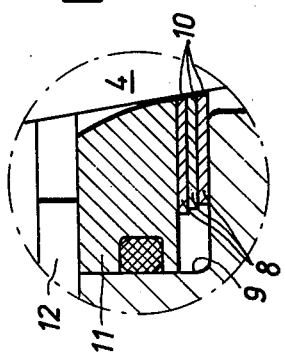

By way of example, the invention will be further described below with reference to the accompanying drawing, in which:

FIG. 1 is a section through a radial piston machine with sealing devices according to the present invention and FIG. 2 is a sectional view to an enlarged scale of a sealing device according to the invention.

In FIG. 1 is illustrated a radial piston machine 1 having a casing 2 within which is mounted an orbiting crank disc 3 supporting pistons 4 adapted to move to and from in piston chambers 5 made in a central cylinder drum 6. The chambers 5 are provided with inlets and outlets (not illustrated) for hydraulic fluid and the pistons 4 as illustrated are made as cylindrical bodies of uniform diameter, said bodies through a foot portion 7 being rigidly connected with the disc 3. During the orbiting motion of the disc 3 the pistons 4 will move into and out of the cylinder chambers 5 with their longitudinal axis forming a varying angle $\alpha$ with the centre axis of each chamber 5. The variations of the angle $\alpha$ in the present case amount to about $\pm 5°$.

In order to obtain a seal between the outer peripheral surface of the piston and piston rod assembly 4 and the interior of the cylinder chamber 5 there is mounted at the mouth or piston rod end of said chamber a sealing device according to the invention. As will be further evident from the detail section to an enlarged scale in FIG. 2 of the drawing said sealing device consists of at least three, annular and radially slitted washers 8, which are made of metal and preferably steel and located in a common circumferential groove in the cylinder or chamber wall. Said washers 8 are known with a cylindrical internal edge surface 10 and are kept in place by means of a support ring 11 in the groove 9, mounted axially outside said washers. In its turn, the support ring 11 is fixed by means of a locking ring 12.

The washer-like rings 8 engage with their cylindrical internal edge surfaces in a sealing relationship against the cylindrical outer peripheral surface of the piston and piston rod assembly 4. Owing to the fact that each washer or ring 8 is relatively thin its slit width or gap size will be small and the set of three or more rings 8 arranged axially after each other form a kind of labyrinth seal. The washers or rings 8 are preferably made of sheet material, particularly steel having desired material properties and the manufacture primarily involves stamping. The rings 8 in each set lie radially slidable in the groove 9 such that they easily can each adjust themselves according to the inclined position of the piston and piston rod assembly 4, said self-adjusting feature also being facilitated by the fact that the washer-like rings 8 in themselves are very smooth and kept adequately lubricated by the leakage flow through the gaps, which also is valid for very high hydraulic fluid pressures of the magnitude of 300-400 bar.

It ought to be obvious that the thinner the rings 8 are, the smaller will their maximum gap size be when inclined and the less leakage will occur through each ring gap. Purely theoretically, the thickness of the rings 8 therefore actually ought to be zero but in practice the ring thickness is selected with respect to prevailing practical conditions. The effective action of the rings can at least to a certain extent be ascribed the condition that in operation they provide a series restrictions of the working fluid leaking therethrough which has been settled to be very advantageous in the present connection. Both the wear of the rings and other parts of the system and damages on the rings can be reduced to a substantial extent owing to said series restriction action. If desired, one or both edges of the active internal cylindrical edge surface might be slightly chamfered in order to reduce somewhat the maximum occurring slit width at the extreme inclined positions of the piston and piston rod assembly relative the centre axis of the cylinder.

I claim:

1. A sealing device for a piston of the type which is rigidly connected with the associated piston rod and which is adapted in a reciprocatory motion within an enclosing cylinder to be inclinable a small angle with its longitudinal axis relative the centre axis of the cylinder, said piston being intended for use in hydraulic mechanisms, particularly such mechanisms having high hydraulic fluid pressures, the sealing device being adapted to provide a seal between the cylinder wall and the piston and piston rod assembly and to comprise a plurality of metal sealing rings, characterized in that the sealing rings consist of three or more annular and radially slitted washers of sheet metal, said washers being arranged radially slidable in a common circumferential groove in the cylinder wall adjacent the piston rod end thereof for self-adjustment with its inner edge surface into sealing engagement with the outer peripheral surface of the piston and piston rod assembly according to the varying inclined position of said assembly.

2. A sealing device according to claim 1, characterized in that the inner edge surface of each washer is cylindrical.

* * * * *